US012676315B2

(12) United States Patent
Matsumasa

(10) Patent No.: US 12,676,315 B2
(45) Date of Patent: Jul. 7, 2026

(54) SECONDARY BATTERY

(71) Applicant: SANYO Electric Co., Ltd., Kadoma (JP)

(72) Inventor: Yoshitaka Matsumasa, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 934 days.

(21) Appl. No.: 17/789,647

(22) PCT Filed: Jan. 22, 2021

(86) PCT No.: PCT/JP2021/002192
§ 371 (c)(1),
(2) Date: Jun. 28, 2022

(87) PCT Pub. No.: WO2021/157383
PCT Pub. Date: Aug. 12, 2021

(65) Prior Publication Data
US 2023/0042891 A1 Feb. 9, 2023

(30) Foreign Application Priority Data
Feb. 7, 2020 (JP) .................................. 2020-019894

(51) Int. Cl.
*H01M 4/66* (2006.01)
*H01M 4/134* (2010.01)
(Continued)

(52) U.S. Cl.
CPC ........... *H01M 4/662* (2013.01); *H01M 4/134* (2013.01); *H01M 10/0587* (2013.01); *H01M 50/536* (2021.01)

(58) Field of Classification Search
CPC .. H01M 4/134; H01M 4/662; H01M 10/0587; H01M 50/536; H01M 50/531; H01M 50/538
See application file for complete search history.

(56) References Cited

U.S. PATENT DOCUMENTS

2019/0217413 A1 7/2019 Yamashita et al.
2019/0224776 A1* 7/2019 Hirose .................... B29C 66/21
2019/0273262 A1 9/2019 Matsumasa et al.

FOREIGN PATENT DOCUMENTS

JP 2010282846 A * 12/2010
JP 2014-143230 A 8/2014
(Continued)

OTHER PUBLICATIONS

Espacenet machine translation of JP-2010282846-A (Year: 2010).*
(Continued)

*Primary Examiner* — Basia A Ridley
*Assistant Examiner* — Julia Marie Fehr
(74) *Attorney, Agent, or Firm* — WHDA, LLP

(57) ABSTRACT

A first electrode current collector is joined to a multilayer of a positive electrode core in a part including no positive electrode active material layer of the first electrode core, by ultrasonic welding in a joint area. The joint area, at which the multilayers of the first electrode core where the first electrode cores are stacked is joined to the first electrode current collector by ultrasonic welding, includes a plurality of core recesses. A core projection is formed between each adjacent pair of the plurality of core recesses of the multilayer of the first electrode core with the first electrode core flexed in a convex shape. A gap in an arc shape is formed between the adjacent pair of the layers of the first electrode core forming the core projection. The gap has a length decreasing from an apex to a bottom of the core projection.

6 Claims, 9 Drawing Sheets

(51) Int. Cl.
  _H01M 10/0587_    (2010.01)
  _H01M 50/536_    (2021.01)

(56)       References Cited

FOREIGN PATENT DOCUMENTS

| | | | |
|---|---|---|---|
| JP | 2018-45975 | A | 3/2018 |
| JP | 2018-94559 | A | 6/2018 |
| JP | 2019-126822 | A | 8/2019 |
| JP | 2019-153438 | A | 9/2019 |

OTHER PUBLICATIONS

Machine translation of Matsuura et al. JP-2010282846-A (Year: 2010).*
Machine translation of JP-2010282846-A Matsuura et al. (Year: 2010).*
International Search Report dated Apr. 6, 2021, issued in counterpart International Application No. PCT/JP2021/002192, w/English Translation. (5 pages).
Extended (Supplementary)European Search Report dated Jul. 7, 2023, issued in counterpart EP Application No. 21751020.5. (4 pages).

* cited by examiner

SECONDARY BATTERY

TECHNICAL FIELD

The present disclosure relates to a secondary battery.

BACKGROUND

Nonaqueous electrolyte secondary batteries such as alkaline secondary batteries and lithium ion batteries are used as on-vehicle power sources mounted on electric vehicles, hybrid electric vehicles, and other vehicles.

As an example of a secondary battery, the following battery is known. Long positive and negative electrode plates are wound with a separator interposed therebetween into a flat wound electrode body which is housed together with an electrolyte in an exterior body. In order to connect the wound electrode body and a current collector, the battery including such a wound electrode body has the following configuration. The wound electrode body includes, at one end, a multilayer of a positive electrode core including no positive electrode active material layer where the positive electrode cores are stacked. The wound electrode body includes, at the other end, a multilayer of a negative electrode core including no negative electrode active material layer where the negative electrode cores are stacked. The multilayers of the positive and negative electrode cores are joined to positive and negative electrode current collectors, respectively, by various welding techniques.

Patent Document 1 discloses the following to increase the joint strength between the wound electrode body and the current collector (or a current collector terminal). In order to join the multilayer of the positive electrode core to the positive electrode current collector by ultrasonic welding, welding recesses are formed a smaller number at the surface of the multilayer of the positive electrode core than at the positive electrode current collector and deeper at the surface than at the positive electrode current collector.

CITATION LIST

Patent Document

PATENT DOCUMENT 1: Japanese Unexamined Patent Publication No. 2010-282846

SUMMARY OF THE INVENTION

Assume that a multilayer of a core made of aluminum or an aluminum alloy is jointed to a current collector made of aluminum or an aluminum alloy by ultrasonic welding as described in Patent Document 1. In this case, a crack tends to occur between the joint area including the welding recesses of the multilayer and a non-joint area outside the joint area.

A secondary battery according to an aspect of the present disclosure includes:

an electrode body including a first electrode plate, and a second electrode plate with a different polarity from the first electrode plate; and a first electrode current collector electrically connected to the first electrode plate:

the first electrode plate including a first electrode core and a first electrode active material layer on the first electrode core, the first electrode core being made of aluminum or an aluminum alloy, the first electrode current collector being made of aluminum or an aluminum alloy, the electrode body including a multilayer of the first electrode core where the first electrode cores are stacked, the first electrode current collector being joined to the multilayer of the first electrode core by ultrasonic welding in a joint area, the joint area, at which the multilayers of the first electrode core is joined to the first electrode current collector by ultrasonic welding, including a plurality of core recesses, a core projection being formed between the core recesses with the first electrode core flexed in a convex shape, a gap in an arc shape being formed between the adjacent pair of the layers of the first electrode core forming the core projection, the gap having a length decreasing from an apex to a bottom of the core projection.

In the secondary battery according to the aspect of the present disclosure, the core projection is obtained by flexing at least $n \times 0.3$ or more layers of the first electrode core, where n is the number of layers of the first electrode core in the multilayer.

In the secondary battery according to the aspect of the present disclosure, the core projection has a height of $n \times 0.3 \times t$ or more from bottoms of the core recesses, where n is the number of layers of the first electrode core in the multilayer of the first electrode core, and t is a thickness of the first electrode core. In other words, horn protrusions of the ultrasonic welder for forming the core recesses and projections may have a height of $n \times 0.3 \times t$ or more.

In the secondary battery according to the aspect of the present disclosure, the gap is left under the core projection in the multilayer of the first electrode core.

In the secondary battery according to the aspect of the present disclosure, the core projection has an apex angle ranging from 60° to 90°.

In the secondary battery according to the aspect of the present disclosure, the first electrode plate has a long shape. The second electrode plate has a long shape. The electrode body is a wound electrode body in a flat shape obtained by winding the first electrode plate and the second electrode plate with a long separator interposed therebetween. The wound electrode body includes, at one end, the multilayer of the first electrode core including an exposed part for the first electrode core which is wound.

According to an aspect of the present disclosure, a secondary battery obtained by joining a multilayer of a core made of aluminum or an aluminum alloy to a current collector made of aluminum or an aluminum alloy by ultrasonic welding has the following advantages. Since ultrasonic vibration energy can be propagated efficiently in the direction of layering the first electrode core without being dispersed to the surroundings, a stable joint area can be formed.

DESCRIPTION OF EMBODIMENT

Findings Obtained by Present Inventor

Figure 1:
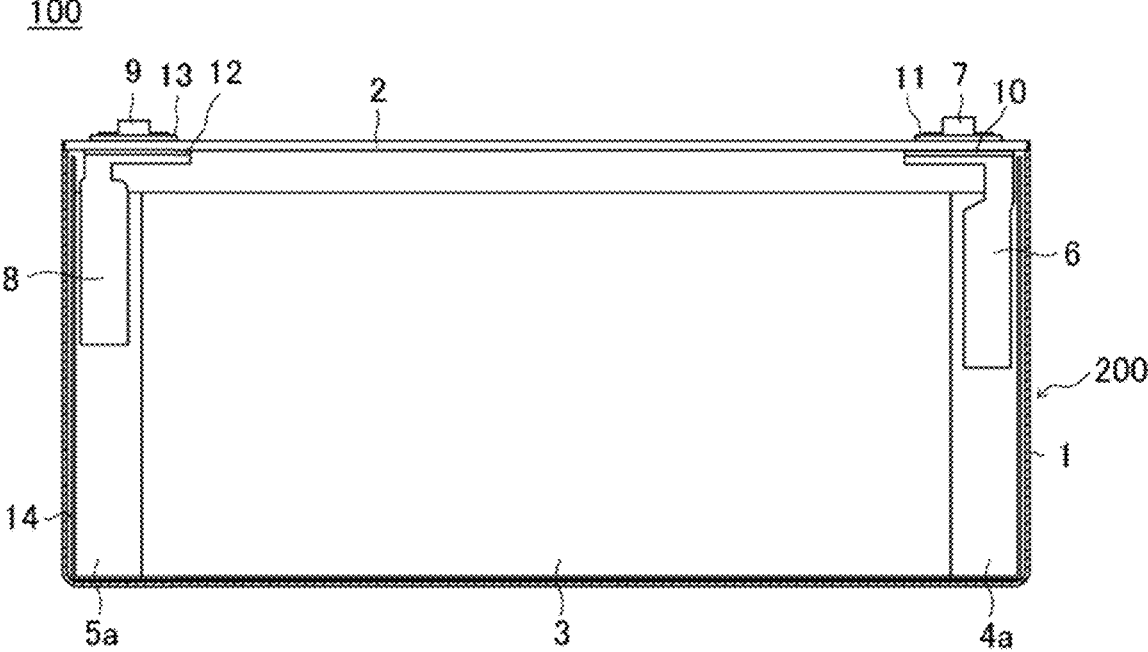
FIG. 1 is a front view showing the inside of a secondary battery according to an embodiment from which front parts of a battery case and an insulation sheet are removed.

The present inventor has used a positive electrode current collector and a multilayer of a positive electrode core, each made of aluminum or an aluminum alloy, and joined the positive electrode current collector to the multilayer by ultrasonic welding as described in Patent Document 1. As a result, the following findings were obtained.

The positive electrode current collector and the multilayer of the positive electrode core, each made of aluminum or an aluminum alloy, were joined together by ultrasonic welding as described in Patent Document 1. In the entire joint area of the multilayer including the welding recesses, the crystal grains of the aluminum were transformed into fine crystal grains. On the other hand, in the non-joint area of the multilayer outside the joint area, the crystal grains of the aluminum were kept in as large sizes as those prior to the ultrasonic welding. That is, the following was found. In the multilayer of the positive electrode core joined to the positive electrode current collector by ultrasonic welding, the crystal grains are under different states (hereinafter referred to as "crystal grain states") such as sizes between the joint and non-joint areas. As a result, there is a high risk of a crack caused by lattice defects between the joint and non-joint areas.

Multilayers including 20 and 100 layers of a positive electrode core were respectively joined to the positive electrode current collector by ultrasonic welding under conditions (i.e., pressure and horn shape) changed from those described in Patent Document 1. In the multilayer including 20 layers of the positive electrode core, an unjoined portion was observed under the joint area including welding recesses, that is, near the boundary between the positive electrode current collector and the multilayer. On the other hand, in the multilayer including 100 layers of the positive electrode core, the phenomenon was observed in which the crystal grains of the aluminum were partially transformed into fine crystal grains in the joint area including the welding recesses. In addition, there was a crack in the multilayer.

After further studies, the present inventor has found the following. In the joint area of the multilayer including the welding recesses, the surfaces of the positive electrode core are joined in a solid phase to stably form a solid-state jointed layer with fine crystal grains near the joint surface. For the purpose, there is a need to efficiently propagate the vibration energy at the time of ultrasonic welding in the direction of layering without being dispersed to the surroundings. The present inventor has also found the following. In order to efficiently propagate the vibration energy in ultrasonic welding in the direction of layering, a predetermined number of layers of the positive electrode core between protrusions of a horn of an ultrasonic welder, that is, between adjacent pairs of welding recesses may be flexed into projections in the joint area of the multilayer with the welding recesses formed by the protrusions provided in the horn of the ultrasonic welder. Here, a gap in an arc shape is left between each pair of the flexed parts of the positive electrode core. Such the gap has a length decreasing from the upper layer to the lower layer of the multilayer of the positive electrode core.

With this configuration, the vibration energy is efficiently propagated in the direction of layering without being dispersed to the surroundings, even when a positive electrode current collector is joined to various numbers of layers of a positive electrode core by ultrasonic welding. This allows stable solid-state joint between the layers of the positive electrode core in the joint area and secures the joint strength.

(Configuration of Secondary Battery)

Now, a secondary battery according to an embodiment of the present disclosure will be described with reference to the drawings. The scope of the present invention is not limited to the following embodiment. Modifications can be made within the scope of the technical idea of the present invention.

First, a configuration of a rectangular secondary battery according to an embodiment will be described.

Figure 2:
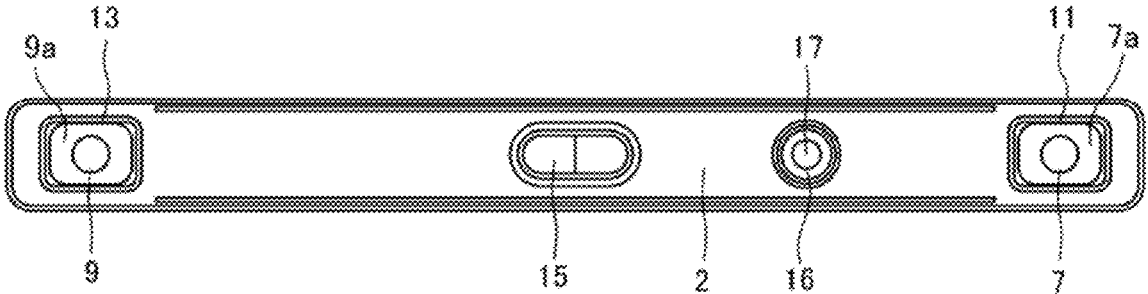
FIG. 2 is a top view of the secondary battery according to the embodiment.

FIG. 1 is a front view showing the inside of a rectangular secondary battery 100 according to the embodiment from which front parts of a battery case and an insulation sheet are removed. FIG. 2 is a top view of the rectangular secondary battery 100.

As shown in FIGS. 1 and 2, the rectangular secondary battery 100 includes a rectangular exterior body 1 with an opening on the top and a sealing plate 2 for sealing the opening. The rectangular exterior body 1 and the sealing plate 2 form a battery case 200. Each of the rectangular exterior body 1 and the sealing plate 2 is made of metal, and may be made of aluminum or an aluminum alloy, for example. The rectangular exterior body 1 houses a flat wound electrode body 3 together with a nonaqueous electrolyte. The wound electrode body 3 is obtained by winding long positive and negative electrode plates with a long separator interposed therebetween. The positive electrode plate includes a positive electrode core made of metal, on which a positive electrode active material layer containing a positive electrode active material is provided, and has, along the length, an exposed part at which the positive electrode core is exposed. The negative electrode plate includes a negative electrode core made of metal, on which a negative electrode active material layer containing a negative electrode active material is provided, and has, along the length, an exposed part at which the negative electrode core is exposed. The positive electrode core may be made of aluminum or an aluminum alloy, for example. The negative electrode core may be made of copper or a copper alloy, for example.

The wound electrode body 3 includes, at one end along the winding axis, a multilayer of a positive electrode core 4a (i.e., the exposed part for the positive electrode core) without any positive electrode active material layer. The positive electrode core 4a is wound into the multilayer without interposing any separator or negative electrode plate. The layered positive electrode core 4a (hereinafter, also referred to as a "multilayer of the positive electrode core") is connected to a positive electrode current collector 6. The positive electrode current collector 6 may be made of aluminum or an aluminum alloy, for example.

The wound electrode body 3 includes, at the other end along the winding axis, a multilayer of a negative electrode core 5a (i.e., the exposed part for the negative electrode core) without any negative electrode active material layer. The negative electrode core 5a is wound into the multilayer without interposing any separator or positive electrode plate. The layered negative electrode core 5a (hereinafter, also referred to as a "multilayer of the negative electrode core") is connected to a negative electrode current collector 8. The negative electrode current collector 8 may be made of copper or a copper alloy, for example.

A positive electrode terminal 7 includes a flange 7a disposed on the outer side of the battery of the sealing plate 2, and an insertion to be inserted into a through-hole of the sealing plate 2. The positive electrode terminal 7 is made of metal, and may be made of aluminum or an aluminum alloy, for example. A negative electrode terminal 9 includes a flange 9a disposed on the outer side of the battery of the sealing plate 2, and an insertion to be inserted into a through-hole of the sealing plate 2. The negative electrode terminal 9 is made of metal, and may be made of copper or a copper alloy, for example. The negative electrode terminal 9 may include a part made of aluminum or an aluminum alloy, and a part made of copper or a copper alloy. In this case, the part made of aluminum or the aluminum alloy may protrude outward beyond the sealing plate 2, and the part made of copper or the copper alloy may be connected to the negative electrode current collector 8.

The positive electrode current collector 6 is fixed to the sealing plate 2 with an internal insulation member 10 made of a resin interposed therebetween. The positive electrode terminal 7 is also fixed to the sealing plate 2 with an external insulation member 11 made of a resin interposed therebetween. The negative electrode current collector 8 is fixed to the sealing plate 2 with an internal insulation member 12 made of a resin interposed therebetween. The negative electrode terminal 9 is also fixed to the sealing plate 2 with an external insulation member 13 made of a resin interposed therebetween.

The wound electrode body 3 is housed in the rectangular exterior body 1 while being covered with an insulation sheet 14. The sealing plate 2 is welded and connected to an opening edge of the rectangular exterior body 1 by laser welding, for example. The sealing plate 2 has an electrolyte inlet 16 which is sealed by a sealing plug 17 after the electrolyte is injected into the rectangular exterior body 1. The sealing plate 2 includes a gas discharge valve 15 for discharging gas when the pressure inside the battery is higher than or equal to a predetermined value.

<Preparation of Electrode Body>

Now, how to prepare the wound electrode body 3 will be described.

Figure 3A:
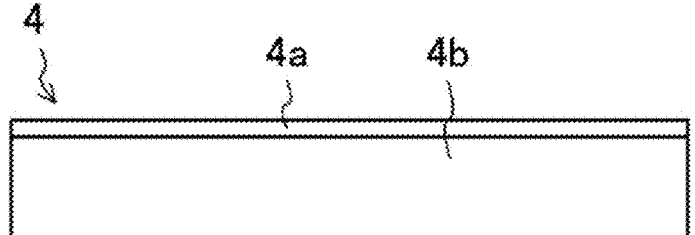
FIG. 3A is a plan view of a positive electrode plate according to the embodiment.

FIG. 3A is a plan view of a positive electrode plate 4 according to this embodiment. As shown in FIG. 3A, the positive electrode plate 4 is obtained by forming a positive electrode active material layer 4b containing the positive electrode active material, on the positive electrode core 4a made of an aluminum alloy, for example. The positive electrode plate 4 has, at one end along the shorter sides, the exposed part for the positive electrode core, with a predetermined width, and without any positive electrode active material layer 4b.

In FIG. 3A, the positive electrode plate 4 is prepared as follows. First, a positive electrode mixture slurry is prepared which contains a positive electrode active material such as lithium nickel cobalt manganese composite oxide, a conductive agent, a binder, and a dispersion medium. Next, the positive electrode mixture slurry is applied to each surface of the positive electrode core 4a which is, for example, a strip-like aluminum alloy foil with a thickness of 15 μm. After that, the positive electrode mixture slurry is dried to remove the dispersion medium. Accordingly, the positive electrode active material layer 4b is formed on each surface of the positive electrode core 4a. Subsequently, the positive electrode active material layer 4b is compressed to a predetermined filling density to complete the positive electrode plate 4.

Figure 3B:
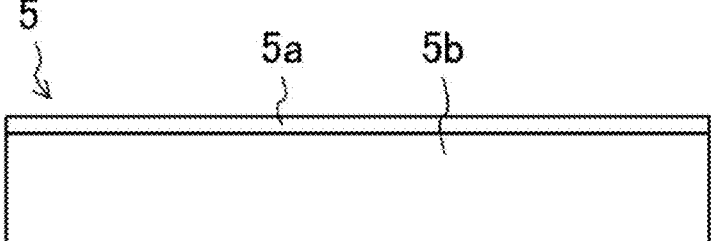
FIG. 3B is a plan view of a negative electrode plate according to the embodiment.

FIG. 3B is a plan view of a negative electrode plate 5 according to this embodiment. As shown in FIG. 3B, the negative electrode plate 5 is obtained by forming a negative electrode active material layer 5b containing the negative electrode active material, on the negative electrode core 5a made of a copper alloy, for example. The negative electrode plate 5 has, at one end along the shorter sides, the exposed part for the negative electrode core, with a predetermined width, and without any negative electrode active material layer 5b.

In FIG. 3B, the negative electrode plate 5 is prepared as follows. First, a negative electrode mixture slurry is prepared which contains a negative electrode active material such as graphite powder, a binder, and a dispersion medium. Next, the negative electrode mixture slurry is applied to each surface of the negative electrode core 5a which is, for example, a strip-like copper foil with a thickness of 8 μm. After that, the negative electrode mixture slurry is dried to remove the dispersion medium. Accordingly, the negative electrode active material layer 5b is formed on each surface of the negative electrode core 5a. Subsequently, the negative electrode active material layer 5b is compressed to a predetermined filling density to complete the negative electrode plate 5.

The positive and negative electrode plates 4 and 5 obtained as described above are shifted from each other so that the exposed parts for the positive and negative electrode cores do not overlap the facing active material layers of the electrodes, and wound into a flat shape with a porous separator made of polyethylene, for example, interposed therebetween. Accordingly, the wound electrode body 3 is obtained which includes the multilayer of the positive electrode core 4a (i.e., the exposed part for the positive electrode core) where the positive electrode cores 4a are stacked at one end and the multilayer of the negative electrode core 5a (i.e., the exposed part for the negative electrode core) where the negative electrode cores Sa are stacked at the other end.

<Attachment of Components to Sealing Plate>

Now, how to attach the positive electrode current collector 6, the positive electrode terminal 7, the negative electrode current collector 8, and the negative electrode terminal 9 to the sealing plate 2 will be described.

First, on the positive electrode side, the external insulation member 11 is disposed on the outer side of the battery of the sealing plate 2, whereas the internal insulation member 10 and the positive electrode current collector 6 are disposed on the inner side of the battery of the sealing plate 2. Next, the insertion of the positive electrode terminal 7 is inserted from the outside of the battery into through-holes of the external insulation member 11, the sealing plate 2, the internal insulation member 10, and the positive electrode current collector 6 to crimp the distal end of the insertion of the positive electrode terminal 7 onto the positive electrode current collector 6. Accordingly, the positive electrode terminal 7, the external insulation member 11, the sealing plate 2, the internal insulation member 10, and the positive electrode current collector 6 are fixed integrally. Note that the crimp at the distal end of the insertion of the positive electrode terminal 7 may be welded to the positive electrode current collector 6.

Similarly, on the negative electrode side, the external insulation member 13 is disposed on the outer side of the battery of the sealing plate 2, whereas the internal insulation member 12 and the negative electrode current collector 8 are disposed on the inner side of the battery of the sealing plate 2. Next, the insertion of the negative electrode terminal 9 is inserted from the outside of the battery into through-holes of the external insulation member 13, the sealing plate 2, the internal insulation member 12, and the negative electrode current collector 8 to crimp the distal end of the insertion of the negative electrode terminal 9 onto the negative electrode current collector 8. Accordingly, the negative electrode terminal 9, the external insulation member 13, the sealing plate 2, the internal insulation member 12, and the negative electrode current collector 8 are fixed integrally. Note that the crimp at the distal end of the insertion of the negative electrode terminal 9 may be welded to the negative electrode current collector 8.

<Attachment of Current Collector to Electrode Body>

Now, how to attach the positive electrode current collector 6 to the multilayer of the positive core of the wound electrode body 3 will be described.

Figure 4:
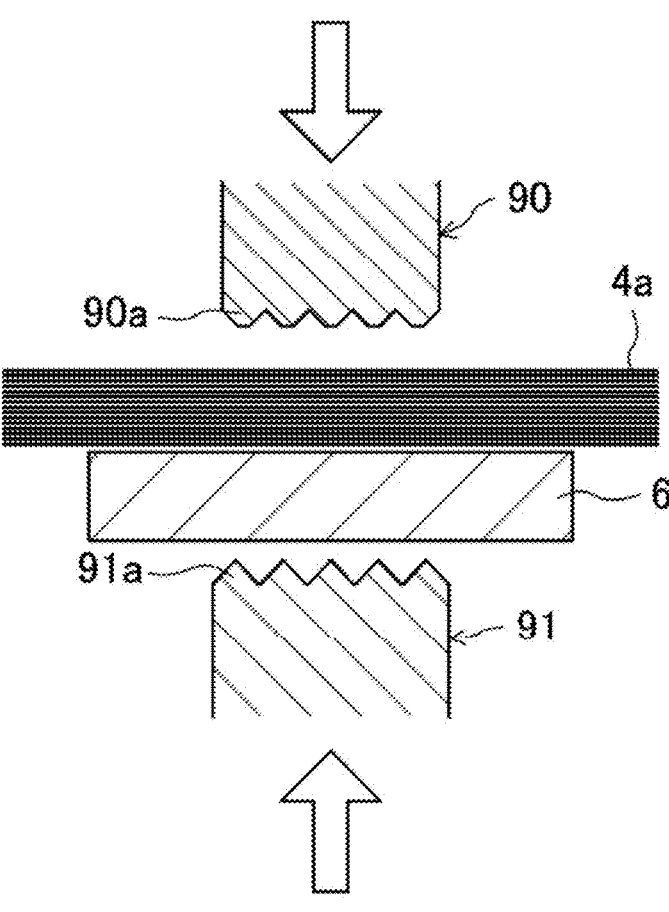
FIG. 4 shows that a multilayer of a positive electrode core and a positive electrode current collector are sandwiched between a horn and an anvil at a time of ultrasonic welding in manufacturing the secondary battery according to the embodiment.

For example, on one outer surface of a multilayer including 60 layers of a positive electrode core 4a of an aluminum alloy with a thickness of 15 μm, a positive electrode current collector 6 of aluminum with a thickness of 0.8 mm is stacked and sandwiched between a horn 90 and an anvil 91 of the ultrasonic welder as shown in FIG. 4. At this time, the horn 90 is disposed in contact with the outer surface of the layered positive electrode core 4a, whereas the anvil 91 is disposed in contact with the surface of the positive electrode current collector 6 which is opposite to the surface in contact with the positive electrode core 4a.

Next, the horn 90 is vibrated to join the layers of the positive electrode core 4a to each other and the positive electrode core 4a to the positive electrode current collector 6. Ultrasonic welding conditions are not particularly limited. For example, the ultrasonic welding may be performed with a load ranging from 1000 N to 2500 N (100 kgf to 250 kgf) applied onto the horn, at a frequency from 19 k Hz to 30 kHz for a welding time of 200 ms to 500 ms. In addition, at a frequency of 20 kHz, the horn amplitude may fall within 50% to 90% of the maximum amplitude (e.g., 50 μm).

Ultrasonic vibration is applied to the layered positive electrode core 4a and the positive electrode current collector 6 to remove oxide films on the surfaces of the positive electrode core 4a and the positive electrode current collector 6 by friction. The layers of the positive electrode core 4a are welded to each other and the positive electrode core 4a is welded to the positive electrode current collector 6 in a solid phase. Accordingly, the layered positive electrode core 4a, that is, the multilayer of the positive electrode core and the positive electrode current collector 6 are joined firmly.

As shown in FIG. 4, the horn 90 has, on the surface in contact with the positive electrode core 4a, a plurality of protrusions 90a which bite into the layered positive electrode core 4a in the ultrasonic welding.

As shown in FIG. 4, the anvil 91 has, on the surface in contact with the positive electrode current collector 6, a plurality of protrusions 91a which bite into the positive electrode current collector 6 in the ultrasonic welding.

<Connection between Multilayer of Positive Electrode Core and Positive Electrode Current Collector>

Figure 5A:
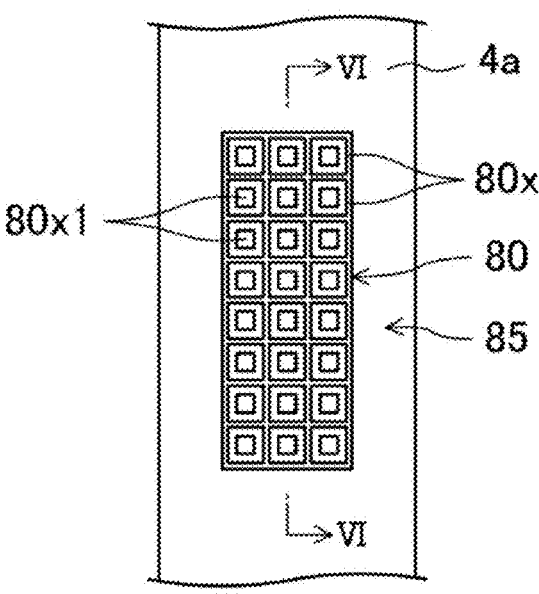
FIG. 5A shows that the multilayer of the positive electrode core is connected to the positive electrode current collector in the secondary battery according to the embodiment in a front view of the multilayer of the positive electrode core.
Figure 5B:
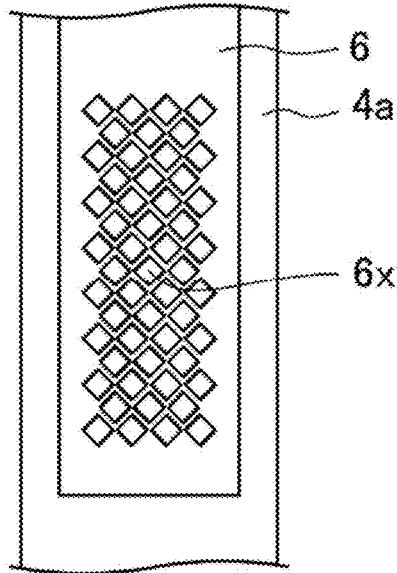
FIG. 5B shows that the multilayer of the positive electrode core is connected to the positive electrode current collector in the secondary battery according to the embodiment in a front view of the positive electrode current collector.

FIGS. 5A and 5B show that the layered positive electrode core 4a (i.e., the multilayer of the positive electrode core) and the positive electrode current collector 6 are connected. FIG. 5A is a front view of the multilayer of the positive electrode core, whereas FIG. 5B is a front view of the positive electrode current collector 6.

As shown in FIG. 5A, the layered positive electrode core 4a and the positive electrode current collector 6 are joined by ultrasonic welding so that the layered positive electrode core 4a includes a joint area 80 jointed to the positive electrode current collector 6. The joint area 80 has a plurality of projections and recesses. Specifically, the joint area 80 has a plurality of core recesses 80x corresponding to the shapes of horn protrusions 90a. Each core recess 80x may have a flat 80x1 at the bottom.

A core recess 80x with the flat 80x1 at the bottom promotes the friction behavior in the joint area 80 in the ultrasonic welding, which allows strong joint between the layers of the positive electrode core 4a and between the positive electrode core 4a and the positive electrode current collector 6. The flat 80x1 may have an area ranging from 0.01 mm² to 0.16 mm², for example.

As shown in FIG. 5B, the positive electrode current collector 6 has, in the area joined to the layered positive electrode core 4a on the surface away from the location of the layered positive electrode core 4a, a plurality of recesses 6x corresponding to the shape of the anvil protrusions 91a. Each recess 6x may have no flat or a flat smaller than the flat 80x1 at the bottom.

The number of the core recesses 80x of the joint area 80 and the number of the recesses 6x of the positive electrode current collector 6 are not particularly limited. As an example, the number of the recesses 6x may be larger than that of the core recesses 80x.

Figure 6:
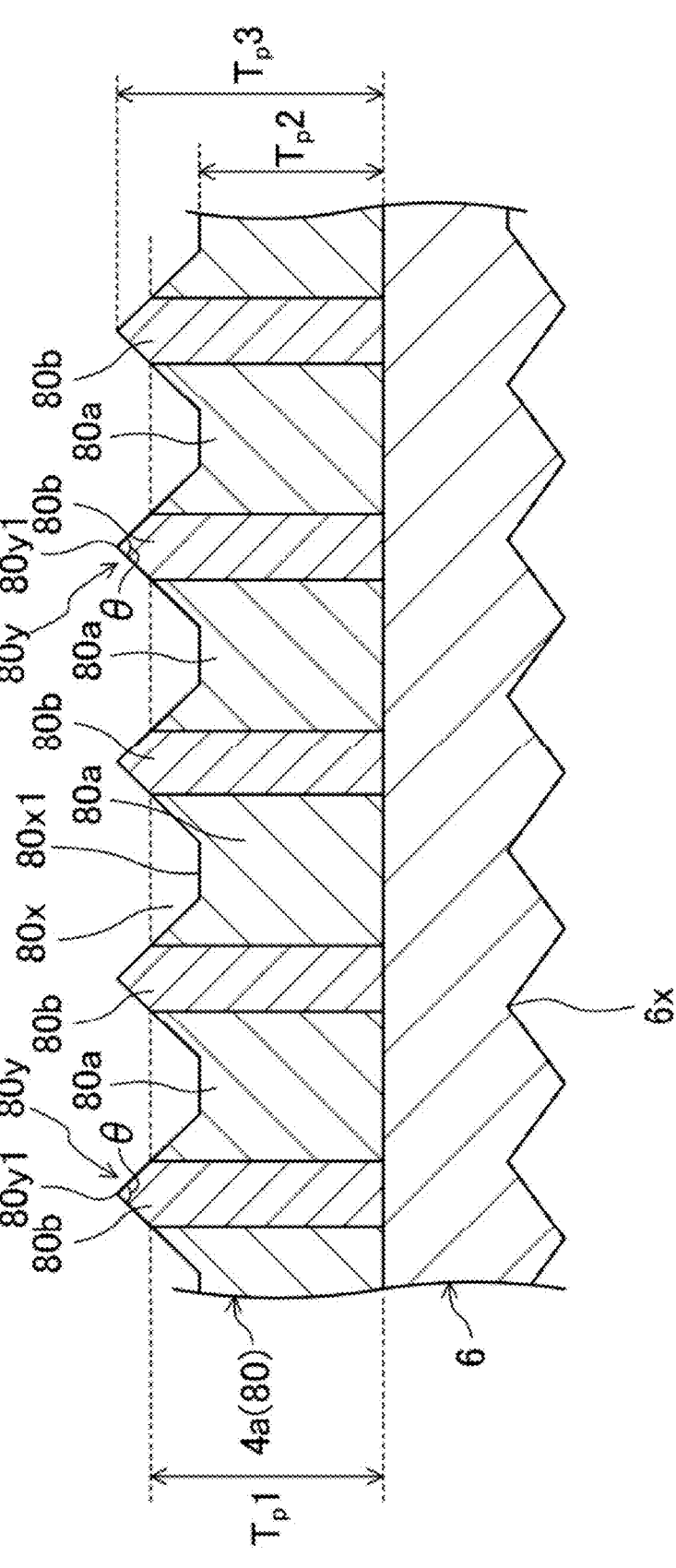
FIG. 6 is a cross-sectional view taken along line VI-VI in FIG. 5A.

FIG. 6 is a cross-sectional view taken along line VI-VI in FIG. 5A.

As shown in FIG. 6, a core projection 80y is formed between each adjacent pair of the core recesses 80x. Each core projection 80y may have an apex 80y1. A core projection 80y with the apex 80y1 promotes the friction behavior in the joint area 80 in the ultrasonic welding, which allows strong joint between the layers of the positive electrode core 4a and between the positive electrode core 4a and the positive electrode current collector 6. Each core projection 80y may have an apex angle ranging from 60° to 90°, for example.

Assume that $T_p1$ denotes the product of the thickness of each layer of the positive electrode core 4a in the area (i.e., a non-joint area 85 in FIG. 5A) not joined to the positive electrode current collector 6 and the number of the layers of the positive electrode core 4a in the joint area 80. As shown in FIG. 6, the joint area 80 of the layered positive electrode core 4a (i.e., the multilayer of the positive electrode core) includes first areas 80a (with the core recesses 80x) with a thickness $T_p2$, and second areas 80b (with the core projections 80y) with a thickness $T_p3$. $T_p2$ is smaller than $T_p1$, whereas $T_p3$ is larger than $T_p1$. The joint area 80 of the multilayer of the positive electrode core with such a configuration reduces damages and breakages in the positive electrode core 4a and firmly joins the positive electrode core 4a to the positive electrode current collector 6.

Figure 7:
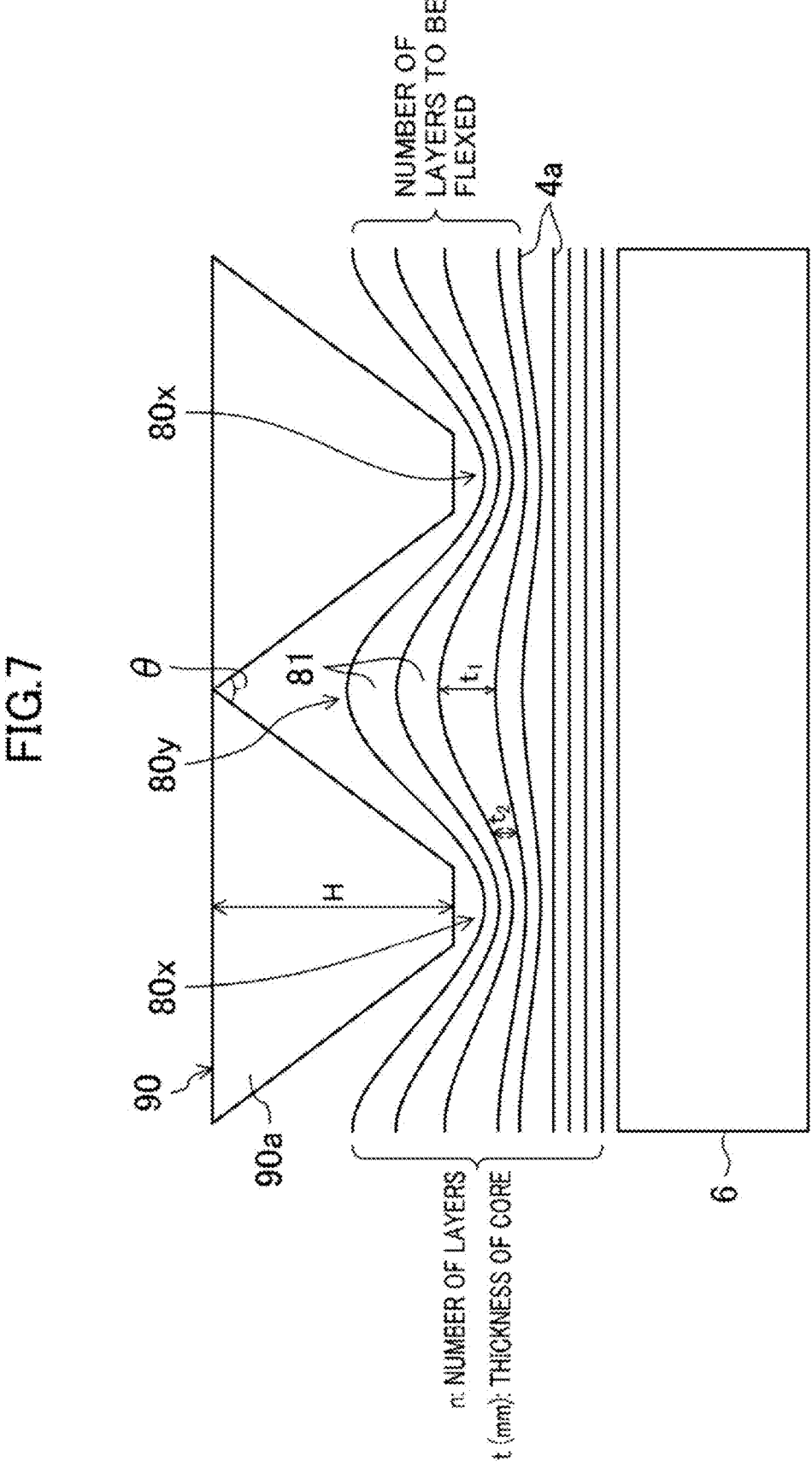
FIG. 7 is a schematic view showing an example joint of the multilayer of the positive electrode core to the positive electrode current collector by ultrasonic welding in manufacturing the secondary battery according to the embodiment.

FIG. 7 is a schematic view showing an example joint of the multilayer of the positive electrode core to the positive electrode current collector by ultrasonic welding in manufacturing the secondary battery according to this embodiment.

As shown in FIG. 7, in order to increase the joint strength (e.g., the peeling strength) between the layers of the positive electrode core 4a in each first area 80a including the core recesses 80x, there is a need to efficiently propagate the vibration of the horn 90 to the lower layer. To meet the need, in this embodiment, the core projections 80y formed between each adjacent pair of the core recesses 80x with the positive electrode core 4a flexed in a convex shape do not diffuse the vibration energy to the surroundings (i.e., the second areas 80b) of the corresponding first area 80a. Here, a gap 81 in an arc shape is left between each adjacent pair of the layers of the first electrode core 4a forming one of the core projections 80y. With this configuration, the layers of the first electrode core 4a are not joined to each other or joined at a smaller joint strength in the second areas 80b including the core projections 80y than in the first area 80a. Accordingly, the diffusion of the vibration energy to the second areas 80b is reduced. In particular, the gap 81 between each pair of the layers of the first electrode core 4a forming the core projection 80y with a length (along the extension of the first electrode core 4a) decreasing from the apex to the bottom allows efficient propagation of the vibration energy in the direction of layering the first electrode core 4a in each first area 80a. Accordingly, a stably strong joint is formed between the layered positive electrode core 4a (i.e., the multilayer of the positive electrode core) and the positive electrode current collector 6.

In this embodiment, assume that the positive electrode core 4a is made of an aluminum alloy. In this case, the core projection 80y may be formed with at least n×0.3 or more layers of the positive electrode core 4a flexed, where n is the number of the layers of the positive electrode core 4a in the multilayer of the positive electrode core. Accordingly, the diffusion of the vibration energy to the second areas 80b is reduced more reliably.

Each core projection 80y has a height (i.e., $T_p3-T_p2$ in FIG. 6) of n×0.3×t or more from the bottoms of the core recesses 80x, where n denotes the number of the layers of the positive electrode core 4a of the multilayer and t is the thickness of the positive electrode core 4a. In other words, the protrusions of the horn 90 (i.e., horn protrusions 90a) of the ultrasonic welder for forming the core recesses 80x and projections 80y may have a height H of n×0.3×t or more. Accordingly, the diffusion of the vibration energy to the second areas 80b is reduced more reliably. Since extremely large core projections 80y cause a smaller joint strength between the layers of the positive electrode core 4a, the horn protrusions 90a may have a height H of n×0.5×t or less.

Another gap 81 may be left under each core projection 80y in the multilayer of the positive electrode core 4a where the positive electrode cores 4a are stacked. Accordingly, the diffusion of the vibration energy to the second areas 80b is reduced more reliably.

Each core projection 80y may have an apex angle θ ranging from 60° to 90°. Here, as shown in FIG. 7, the apex angle θ of each core projection 80y is equal to the angle θ formed by each adjacent pair of the horn protrusions 90a. An apex angle θ out of the range from 60° to 90° causes difficulty in flexing the positive electrode core 4a.

In the arc-shaped gap 81 between each adjacent pair of the layers of the positive electrode core 4a forming one of the core projections 80y, as shown in FIG. 7, the with $t_1$ of the gap 81 at an apex of the core projection 80y may be larger than the width $t_2$ of the gap 81 at a hem of the core projection 80y.

Figure 8:
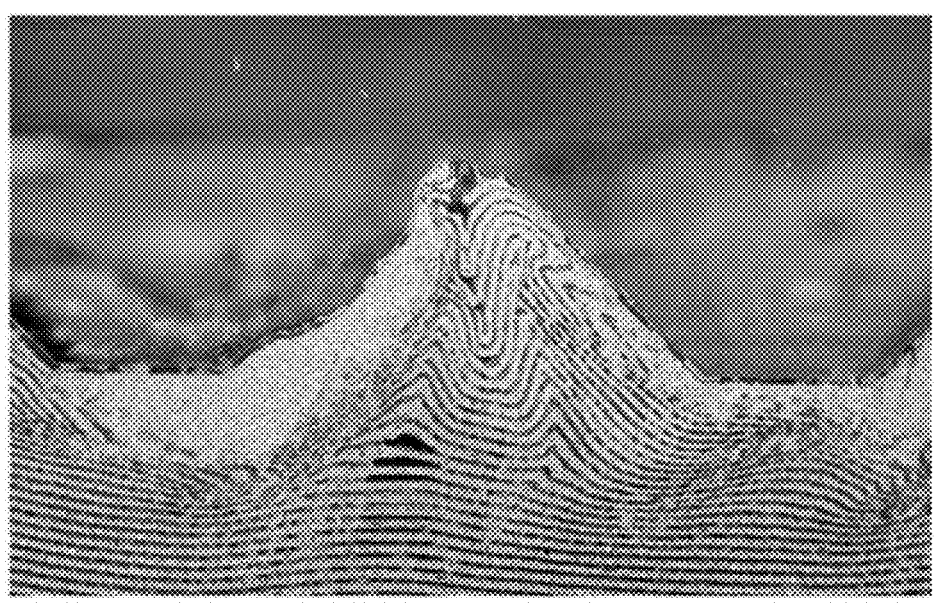
FIG. 8 is a photograph showing a cross section of a multilayer of a positive electrode core in a secondary battery according to Comparative Example 1.

FIG. 8 is a photograph showing a cross section of a multilayer of a positive electrode core after being joined to a positive electrode current collector in a secondary battery according to Comparative Example 1 (i.e., Patent Document 1). As shown in FIG. 8, the multilayer of the positive electrode core according to Comparative Example 1 has core recesses and projections with a sufficient height formed by ultrasonic welding. However, the crystal grains of the positive electrode core, that is, the aluminum alloy foil are changed, and the crystal grain state before welding is not maintained even in the area including the core projections. As a result, a solid-state welding state is not stably obtained by ultrasonic welding in the multilayer of the positive electrode core, and the crystal grain state is discontinuous.

As described above, in this embodiment, since the target states of the first areas 80a (with the core recesses 80x) and the second areas 80b (with the core projections 80y) at the time of welding are clear, the ultrasonic welding conditions that enable strong joint can be set stably. Even with a change in the number of the layers of the positive electrode core 4a, the joint area 80 stably joined in the solid phase is formed between the multilayer of the positive electrode core and the positive electrode current collector 6 by ultrasonic welding, which secures the joint strength. On the other hand, Comparative Example 1 fails to particularly focus on the state of the second areas (with the core projections) and thus has difficulty in stably setting the ultrasonic welding conditions that enable strong joint due to a variation factor such as a change in the number of the layers of the core.

Examples 1 to 3

Multilayers including 40 to 80 layers of a positive electrode core 4a of an aluminum alloy (A3003) with a thickness of 15 μm are joined to a positive electrode current collector 6 made of aluminum with a thickness of 0.8 mm by ultrasonic welding under conditions different from each other. Specifically, Example 1 is as follows. A multilayer including 40 layers of the positive electrode core 4a is joined to the positive electrode current collector 6 by ultrasonic welding. Fourteen layers (=40 layers×0.35) of the positive electrode core 4a are flexed, thereby forming gaps in an arc shape between adjacent pairs of the layers of the positive electrode core 4a in the second areas 80b including the core projections 80y out of the joint area 80. On the other hand, Example 2 is as follows. A multilayer including 60 layers of the positive electrode core 4*a* is joined to the positive electrode current collector 6 by ultrasonic welding. Nineteen layers (=60 layers×0.31) of the positive electrode core 4*a* are flexed, thereby forming gaps in an arc shape between adjacent pairs of the layers of the positive electrode core 4*a* in the second areas 80*b* including the core projections 80*y* out of the joint area 80. In addition, Example 3 is as follows. A multilayer including 80 layers of the positive electrode core 4*a* is joined to the positive electrode current collector 6 by ultrasonic welding. Twenty four layers (=80 layers×0.3) of the positive electrode core 4*a* are flexed, thereby forming gaps in an arc shape between adjacent pairs of the layers of the positive electrode core 4*a* in the second areas 80*b* including the core projections 80*y* out of the joint area 80. In each example, an ultrasonic welder with a frequency of 20 kHz was used.

<center>Comparative Example 2</center>

A multilayer including 80 layers of a positive electrode core 4*a* of an aluminum alloy (A3003) with a thickness of 15 μm is joined to a positive electrode current collector 6 made of aluminum with a thickness of 0.8 mm by ultrasonic welding under the conditions shown in Table 1. Specifically, Comparative Example 2 is as follows. The multilayer including 80 layers of the positive electrode core 4*a* is joined to the positive electrode current collector 6 by ultrasonic welding. Twenty (=80×0.25) layers of the positive electrode core 4*a* are flexed in the second areas 80*b* including the core projections 80*y* out of the joint area 80. In Comparative Example 2 as well, an ultrasonic welder with a frequency of 20 kHz was used.

Figure 9:
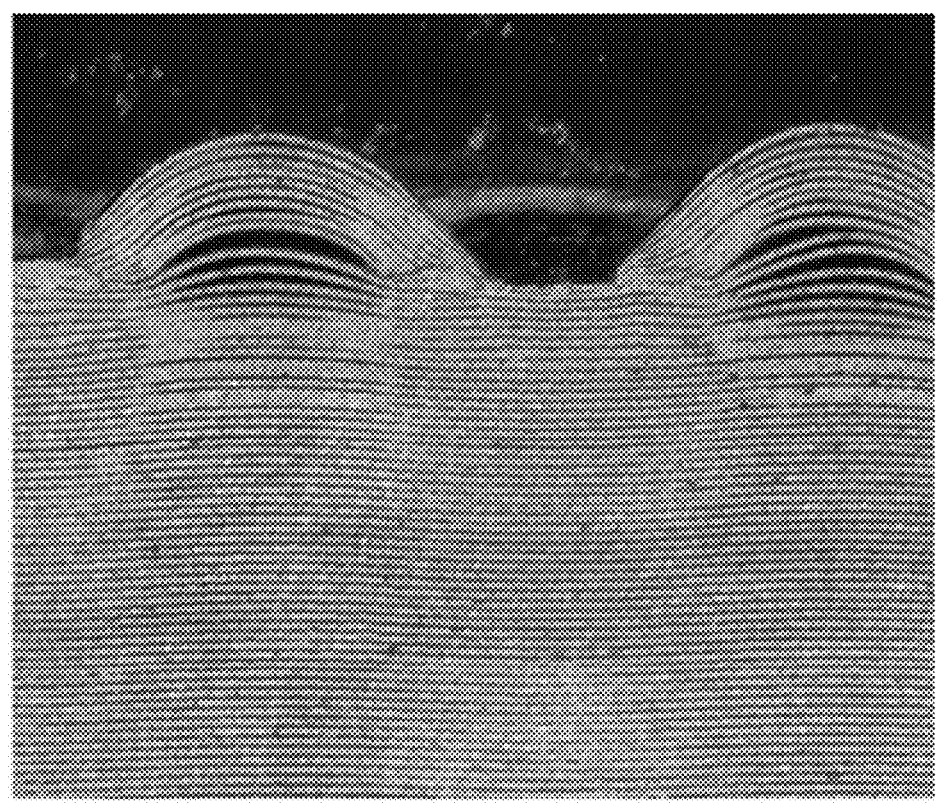
FIG. 9 is a photograph showing a cross section of a multilayer of a positive electrode core in a secondary battery according to Example 1.
Figure 10:
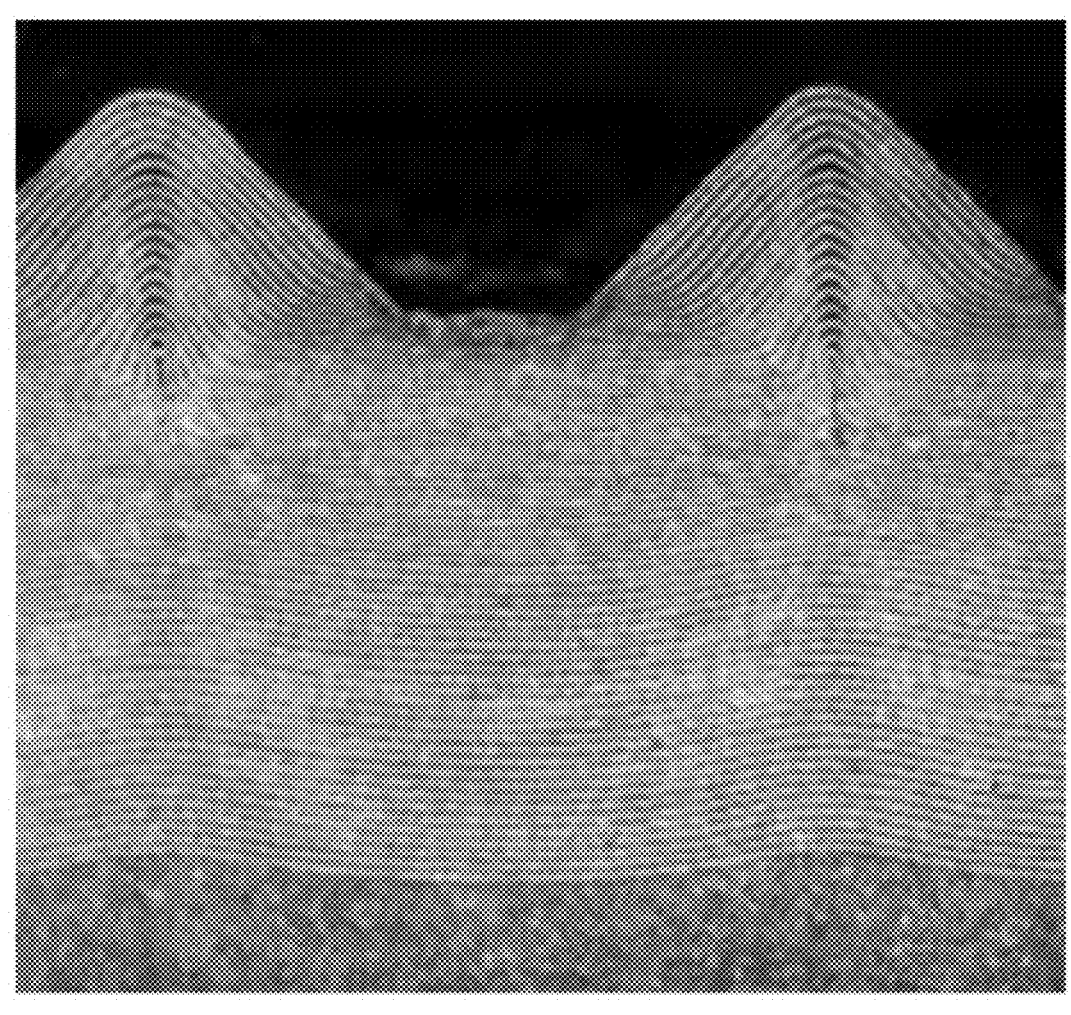
FIG. 10 is a photograph showing a cross section of a multilayer of a positive electrode core in a secondary battery according to Example 2.
Figure 11:
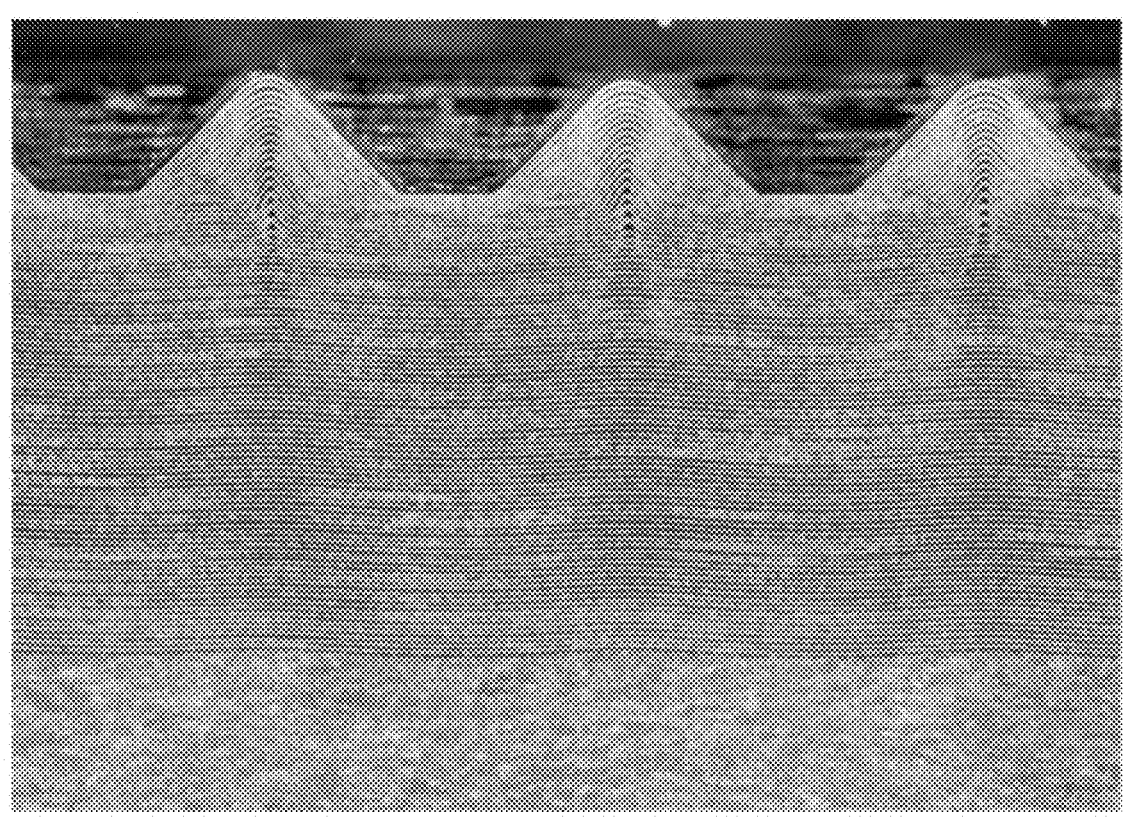
FIG. 11 is a photograph showing a cross section of a multilayer of a positive electrode core in a secondary battery according to Example 3.

Table 1 below shows the ultrasonic welding conditions in Examples 1 to 3 and Comparative Example 2 described above, the number of flexed layers of the positive electrode core 4*a* in the cross section of the multilayer of the positive electrode core (i.e., the cross section of each second area 80*b*) after the welding, and the presence or absence of changes in the crystal grain state and of a crack. FIGS. 9 to 11 are cross-sectional photographs each showing the multilayer of the positive electrode core after being joined to the positive electrode current collector in the secondary battery according to the corresponding one of Examples 1 to 3.

insufficiently between each adjacent pair of the layers of the positive electrode core 4*a*, which causes the layers of the positive electrode core 4*a* to dense to each other. As a result, no layer is found to be joined in a solid phase between the layers of the positive electrode core 4*a*. The entire multilayer of the positive electrode core became fine crystal grains, and there was a crack in a part of the multilayer of the positive electrode core.

The embodiment (including the examples. The same applies hereinafter) of the present disclosure have been described above. The present invention is not limited to the embodiment described above. Various modifications can be made within the scope of the invention. That is, the description of the embodiment described above is merely an example in nature, and is not intended to limit the present invention, applications, or uses thereof.

For example, in this embodiment, a rectangular secondary battery with a flat wound electrode body is described as an example of a secondary battery. The present invention is also applicable to ultrasonic welding of a multilayer of a positive electrode core and a positive electrode current collector in another electrode body including the multilayer. The other electrode body is obtained by, for example, alternately stacking positive and negative electrodes with separators interposed therebetween. Further, the multilayer may be obtained by, for example, stacking positive electrode current collector tabs protruding from the positive electrodes. The type of the secondary battery is not particularly limited. In addition to a lithium secondary battery, the present invention is applicable to various batteries including: electrode bodies made of different materials; and different electrolytes. The present invention is not limited to a rectangular battery but is applicable to secondary batteries in various shapes (e.g., a cylindrical shape). In addition, the shape of the electrode body, the electrode active materials of the positive and the negative electrodes, the material of the electrolyte, and other characteristics may be modified as appropriate depending on the applications.

An example has been described in this embodiment where the positive electrode core is made of aluminum or an aluminum alloy, and the positive electrode current collector is made of aluminum or an aluminum alloy. Instead, the <center>TABLE 1</center>

| | Number of Layers of Core | Load (N) on Horn | Amplitude (%) of Horn | Welding Time (ms) | Number of Flexed Layers of Positive Electrode Core | Number of Flexed Layers/Number of Layers | Presence or Absence of Changes in Crystal Grain State and of Crack |
|---|---|---|---|---|---|---|---|
| Example 1 | 40 | 1800 | 60 | 300 | 14 | 0.35 | N |
| Example 2 | 60 | 1800 | 70 | 300 | 19 | 0.31 | N |
| Example 3 | 80 | 1800 | 75 | 300 | 24 | 0.30 | N |
| Comparative Example 2 | 80 | 1800 | 80 | 300 | 20 | 0.25 | Y |

As shown in Table 1, in the ultrasonic welding under the conditions of Examples 1 to 3, a sufficient number of the layers of the positive electrode core 4*a* are flexed in the second areas 80*b*. The gaps 81 in an arc shape are left between adjacent pairs of the layers of the positive electrode core 4*a* forming the core projections 80*y* as shown in FIGS. 9 to 11. As a result, the crystal grain state is unchanged and no crack occurs in the second areas 80*b*.

On the other hand, in Comparative Example 2, an insufficient number of the layers of the positive electrode core 4*a* are flexed in the second areas 80*b*. Although the core projections 80*y* are formed, the arc-shaped gap is formed negative electrode core may be made of aluminum or an aluminum alloy, and the negative electrode current collector may be made of aluminum or an aluminum alloy.

A core made of aluminum or an aluminum alloy preferably has a thickness ranging from 5 μm to 30 μm, and more preferably from 10 μm to 20 μm, for example. A core made of aluminum or an aluminum alloy may preferably include 20 to 100 layers, and more preferably to 80 layers.

A current collector made of aluminum or an aluminum alloy preferably has a thickness ranging from 0.5 mm to 2.0 mm, more preferably from 0.8 mm to 1.5 mm, for example.

DESCRIPTION OF REFERENCE CHARACTERS

100 Rectangular Secondary Battery
200 Battery Case
1 Rectangular Exterior Body
2 Sealing Plate
3 Wound Electrode Body
4 Positive Electrode Plate
4a Positive Electrode Core
4b Positive Electrode Active Material Layer
5 Negative Electrode Plate
5a Negative Electrode Core
5b Negative Electrode Active Material Layer
6 Positive Electrode Current Collector
6x Recess of Current Collector
7 Positive Electrode Terminal
7a Flange
8 Negative Electrode Current Collector
9 Negative Electrode Terminal
9a Flange
10 Internal Insulation Member
11 External Insulation Member
12 Internal Insulation Member
13 External Insulation Member
14 Insulation Sheet
15 Gas Discharge Valve
16 Electrolyte Inlet
17 Sealing Plug
80 Joint Area
80a First Area
80b Second Area
80x Core Recess
80x1 Flat
80y Core Projection
80y1 Apex
85 Non-Joint Area
90 Horn
90a Horn Protrusion
91 Anvil
91a Anvil Protrusion

The invention claimed is:

1. A secondary battery comprising:

an electrode body including a first electrode plate, and a second electrode plate with a different polarity from the first electrode plate; and a first electrode current collector electrically connected to the first electrode plate;

the first electrode plate including a first electrode core and a first electrode active material layer on the first electrode core, the first electrode core being made of aluminum or an aluminum alloy, the first electrode current collector being made of aluminum or an aluminum alloy, the electrode body including a multilayer of the first electrode core where the first electrode cores are stacked, the first electrode current collector being joined to the multilayer of the first electrode core by ultrasonic welding in a joint area, the joint area, at which the multilayers of the first electrode core is joined to the first electrode current collector by ultrasonic welding, including a plurality of core recesses, a core projection being formed between the core recesses with the first electrode core flexed in a convex shape, a gap in an arc shape being formed between an adjacent pair of layers of the multilayer of the first electrode core forming the core projection, the core projection has a height of $n \times 0.5 \times t$ or less from bottoms of the core recesses, where n is the number of layers of the first electrode core in the multilayer of the first electrode core, and t is a thickness of the first electrode core.

2. The secondary battery of claim 1, wherein the core projection is obtained by flexing at least $n \times 0.3$ or more layers of the first electrode core, where n is the number of layers of the first electrode core in the multilayer of the first electrode core.

3. The secondary battery of claim 1, wherein the core projection has a height of $n \times 0.3 \times t$ or more from bottoms of the core recesses, where n is the number of layers of the first electrode core in the multilayer of the first electrode core, and t is a thickness of the first electrode core.

4. The secondary battery of claim 1, wherein the gap is left under the core projection in the multilayer of the first electrode core.

5. The secondary battery of claim 1, wherein the core projection has an apex angle ranging from 60° to 90°.

6. The secondary battery of claim 1, wherein the first electrode plate has a long shape, the second electrode plate has a long shape, the electrode body is a wound electrode body in a flat shape obtained by winding the first electrode plate and the second electrode plate with a long separator interposed therebetween, and the wound electrode body includes, at one end, the multilayer of the first electrode core including an exposed part for the first electrode core that is wound.

* * * * *